US007558636B2

(12) United States Patent
Arndt et al.

(10) Patent No.: US 7,558,636 B2
(45) Date of Patent: Jul. 7, 2009

(54) APPARATUS AND METHOD FOR ADAPTIVE SIGNAL CHARACTERIZATION AND NOISE REDUCTION IN HEARING AIDS AND OTHER AUDIO DEVICES

(75) Inventors: Horst Arndt, Canada (CA); Henry Luo, Waterloo (CA)

(73) Assignee: Unitron Hearing Ltd., Kitchener, ON (CA)

(*) Notice: Subject to any disclaimer, the term of this patent is extended or adjusted under 35 U.S.C. 154(b) by 1187 days.

(21) Appl. No.: 10/101,598

(22) Filed: Mar. 21, 2002

(65) Prior Publication Data

US 2002/0191804 A1 Dec. 19, 2002

Related U.S. Application Data

(60) Provisional application No. 60/277,275, filed on Mar. 21, 2001.

(51) Int. Cl.
*G06F 17/00* (2006.01)
*H04B 15/00* (2006.01)

(52) U.S. Cl. ........................................ 700/94; 381/94.1

(58) Field of Classification Search .................. 700/94; 381/57, 312, 317, 320, 94.1, 94.2, 94.3; 704/231, 236
See application file for complete search history.

(56) References Cited

U.S. PATENT DOCUMENTS 4,025,721 A 5/1977 Graupe et al.
4,185,168 A 1/1980 Graupe et al.
4,628,529 A * 12/1986 Borth et al. ................ 381/94.3
4,852,175 A 7/1989 Kates
5,027,410 A * 6/1991 Williamson et al. .......... 381/320
5,097,510 A * 3/1992 Graupe ....................... 704/233
5,781,888 A * 7/1998 Herre ....................... 704/200.1
6,198,830 B1 3/2001 Holube et al.
6,782,361 B1 * 8/2004 El-Maleh et al. ............ 704/226

(Continued)

FOREIGN PATENT DOCUMENTS

EP 0 599 132 A1 1/1994

OTHER PUBLICATIONS

Examination Report for European patent application No. 02 716 565.3 dated Aug. 11, 2006.

(Continued)

*Primary Examiner*—C. K.
*Assistant Examiner*—Daniel R Sellers
(74) *Attorney, Agent, or Firm*—Bereskin & Parr LLP

(57) ABSTRACT

A system and method for characterizing the contents of an input audio signal and for suppressing noise components of the input audio signal are described. The audio signal is divided into a number of frequency domain input signals. Each frequency domain input signal can be processed separately to determine its intensity change, modulation frequency, and time duration characteristics to characterize the frequency domain input signal as containing a desirable signal or as a type of noise. An index signal is calculated based on a combination of the determined characteristics and signals identified as noise are suppressed in comparison to signals identified as desirable to produce a set of frequency domain output signals with reduced noise. The frequency domain output signals are combined to provide an output audio signal corresponding to the input audio signal but having suppressed noise components and comparatively enhanced desirable signal components.

70 Claims, 10 Drawing Sheets

U.S. PATENT DOCUMENTS 7,043,030 B1 * 5/2006 Furuta ........................ 381/94.1

OTHER PUBLICATIONS

Patent Cooperation Treaty, International Search Report, PCT/CA02/00397, International Filing Date Mar. 21, 2002.

Signal-processing algorithms for a new software-based, digital hearing device, Edwards, Brent W., Hou, Zezhang, Struck, Christopher J., Dharan, Priya, The Hearing Journal, Sep. 1998, vol. 51, No. 9. pp. 44-52.

Examination Report for European patent application 02716565.3 dated Aug. 30, 2007.

Office Action for Canadian patent application 2,341,834 dated May 15, 2007.

* cited by examiner

APPARATUS AND METHOD FOR ADAPTIVE SIGNAL CHARACTERIZATION AND NOISE REDUCTION IN HEARING AIDS AND OTHER AUDIO DEVICES

FIELD OF THE INVENTION

This invention relates to a method and apparatus for digital signal processing of audio signals. More particularly, the invention is suitable for use in a hearing aid or other devices in which noise signals are to be adaptively detected and suppressed in comparison to desirable signals.

BACKGROUND OF THE INVENTION

The use of digital signal processing in hearing aids and other devices has become commonplace. One goal of such systems is to provide amplification of desirable audio information in a signal while suppressing undesirable audio noise in the signal.

A person using a hearing aid or other audio device will typically be in an environment with several different types of real-life audio signals consisting of noises and desirable sounds. Examples of such audio signals are: stationary noise (such as a fan or motor), pseudo-stationary noise (such as traffic noise or speech babble), desirable sounds (such as speech or music) and transient noise (such as gun shots or a door slamming).

Various methods of detecting noise have been proposed and implemented.

In one system, described in U.S. Pat. No. 4,852,175, the incoming audio signal is divided into a set of frequency bands and the "sound events" in each band are categorized by their amplitude (or intensity). An assumption is made that a preselected percentage of the sound events with the lowest amplitude are noise events and a gain is calculated separately for each band to attempt to minimize the effect of the identified noise on an output signal, which is formed by recombining the signal from each frequency band after having multiplied it by the calculated gain. This system is deficient because it makes a presumption that a certain percentage of sound events in each frequency band are noise based only on their amplitude. This presumption is not a reliable measure of noise in most circumstances. Furthermore, this system cannot adapt to changing conditions in which noise is more or less prevalent at different times. The result is that many noise sound events will not be categorized as noise and many non-noise sound events will be categorized as noise.

In another system, described in U.S. Pat. No. 4,185,168, the absolute value, or a function thereof (e.g. the RMS value), of the signal in each frequency band is used to estimate the noise content in the frequency band, assuming that the noise has a fixed or narrow frequency spectrum over a selected time period. Alternatively, a smoothed version of the signal in each band can be used to produce the signal-to-noise ratio, SNR, which can be used to determine the presence of noise. If noise is detected, the gain of the band relative to other bands is reduced so that bands with noise are suppressed in favor of bands without noise. While this system does not assume that a selected amount of audio information in each band will be noise, it is deficient because it assumes that noise has a frequency spectrum which does not vary with time or varies only within a narrow range over a period of time. This system is accordingly limited to detecting stationary or slowly changing pseudo-stationary noise.

There is a need for a signal characterization and noise reduction system that is adaptable to signals which have different noise content over time and which is capable of detecting and suppressing different types of noise.

SUMMARY OF THE INVENTION

The present invention provides a signal characterization and noise reduction system which detects desirable signals and noise based on various characteristics of different types of noise and desired signals.

Comparison of the different types of noise provides several characteristics which may be used to characterize the signal, or part of it, as a type of noise or as a desired signal.

One such characteristic is the change in the intensity (or volume) of the audio signal over a selected time period or the "intensity change" of the signal. The intensity change of a signal indicates the range of its intensity over the time period. The four types of audio information may be placed generally onto a continuum in which:

- stationary noises exhibit the smallest changes in intensity;
- pseudo-stationary noises exhibit larger changes in intensity than stationary noises but smaller changes than desirable sounds; and
- transient noises exhibit larger changes in intensity than desirable signals.

Another characteristic which may be used to classify audio information in a sound signal is the frequency of the signal's intensity modulation over a selected time period or the "modulation frequency". The modulation frequency is the number of cycles in the intensity of an audio signal during a time period. For example, an audio signal which exhibits 30 peaks in its intensity over a one second period will have a modulation frequency of 30 Hz. The individual peaks will generally not have the same intensity, and may in fact be substantially different. The four types of audio information may be placed generally onto a continuum in which:

- stationary noises exhibit the lowest modulation frequency;
- pseudo-stationary noises exhibit higher modulation frequencies than stationary noises but lower modulation frequencies than desirable sounds; and
- transient noises exhibit higher modulation frequencies than desirable signals.

The present invention provides a digital signal processing circuit for processing signals that advantageously uses these characteristics of the desirable signal and noise components of a typical audio signal to amplify desired sounds while suppressing the noise components.

An incoming sound signal is first converted into an analog input signal. The analog input signal is digitized and then divided into a set of frequency domain input signals, each of which corresponds to a part of the audio signal within one frequency band. The frequency domain input signals are analyzed separately.

Each frequency domain input signal is analyzed to determine the change in the intensity of the signal during a selected time period and to produce an intensity change sub-index, which characterizes the frequency domain input signal as one of the different types of noise or as a desired signal.

Simultaneously, the frequency domain input signal is analyzed to determine the modulation frequency of the signal during a selected period (which may or may not be equal to the period selected to analyze changes in intensity) and to produce a modulation frequency sub-index, which characterizes the frequency domain input signal as one the different types of noise or as a desired signal.

The intensity change sub-index and modulation frequency sub-index are combined to produce a signal index which characterizes the frequency domain input signal along a two dimensional continuum defined by the change in intensity and modulation frequency criteria. The signal index is then converted into a gain signal, which may be done by using a look up table or a formula. The frequency domain input signal is then multiplied by the gain signal to produce a frequency domain output signal. The several frequency domain output signals calculated in this fashion are combined to form a digital output signal which is converted into an analog output signal, which is then converted into a sound signal using a loudspeaker.

Using this method, the audio signal is sliced into different parts defined by the frequency bands. The components of the audio signal in each frequency band are analyzed and the entire band is characterized along a two-dimensional continuum as stationary noise, pseudo-stationary noise, desirable signal or as transient noise. The components in the frequency band are then amplified (or suppressed) in order to amplify desirable signals in preference to noise. The resulting signals are combined to produce an output sound signal which has an amplified desired signal component and relatively suppressed noise components.

In a second embodiment of the present invention the frequency domain input signals are also analyzed according to a third characteristic: the time duration of the signal. The four types of audio information may be placed generally onto a continuum in which:

- stationary noises generally exhibit the longest time duration;
- pseudo-stationary noises generally exhibit shorter time duration than stationary noises but longer time duration than desirable sounds; and
- transient noises generally exhibit much shorter time duration than desired signals.

The frequency domain input signal is analyzed to determine the duration of its sound components and to produce a duration sub-index, which is combined with the intensity change and modulation frequency sub-indices to produce a signal index on a three dimensional continuum. This signal index is used to generate a gain signal as in the two dimensional embodiment.

The invention may be configured to use only one of the three characteristics (change in intensity, modulation frequency or time duration) to produce the signal index. Alternatively, any two or all three of the characteristics may be used. Furthermore, other characteristics of a sound signal may be used to classify the sound signal. For example, characteristics such as common onset/offset of frequency components, common frequency modulation, common amplitude modulation may be used to characterize an audio signal.

Depending on the particular requirements of a particular embodiment of the present invention, other types of signals may be considered desirable. For example, in a situation where explosions (a transient noise) are to be identified in a loud background noise (a stationary or pseudo-stationary noise), then the sub-indices and the gain signal will be configured accordingly to emphasize the transient noise and suppress other sounds, including speech and music sounds described above as desirable signals.

BRIEF DESCRIPTION OF THE DRAWINGS

A preferred embodiment of the present invention will now be described in detail with reference to the drawings, in which.

DETAILED DESCRIPTION OF THE PREFERRED EMBODIMENT

Figure 1:
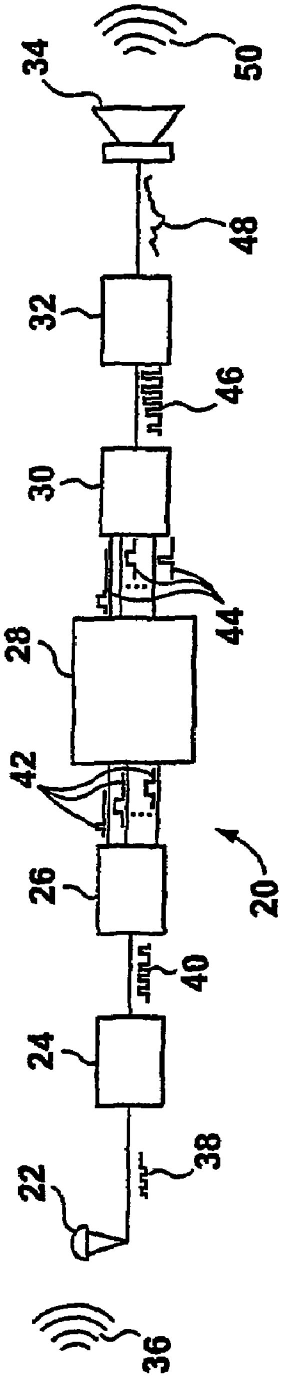
FIG. 1 is a block diagram of a first embodiment of a signal processing circuit for adaptively characterizing and reducing noise according to the present invention.

Reference is first made to FIG. 1, which illustrates a signal processing circuit 20 according to a first preferred embodiment of the present invention. Circuit 20 includes a microphone 22, a analog-to-digital converter (ADC) 24, an analysis filter 26, a gain stage 28, a synthesis filter 30, a digital-to-analog converter (DAC) 32 and a loudspeaker 34.

Microphone 22 receives an input sound signal 36 and provides an analog input signal 38 corresponding to input sound signal 36. Input sound signal 36 contains both desirable audio information and undesirable audio noise. Microphone 22 may be any type of sound transducer capable of receiving a sound signal and providing a corresponding analog electrical signal. ADC 24 receives analog input signal 38 and produces time domain digital input signal 40. Analysis filter 26 receives digital input signal 40 and produces one or more corresponding frequency domain input signals 42-1, 42-2, . . . , 42-N in response to digital input signal 40. Each frequency domain input signal 42 is processed separately by gain stage 28, which provides a set of frequency domain output signals 44-1, 44-2, . . . 44-N, each corresponding to one of the frequency domain input signal 42. Synthesis filter 30 combines the frequency domain output signals 44 into a time domain digital output signal 46. DAC 32 converts the time domain digital output signal 46 into an analog output signal 48. Loudspeaker 34 converts analog output signal 48 into an output sound signal 50 which may be heard by a user of circuit 20.

Figure 2:
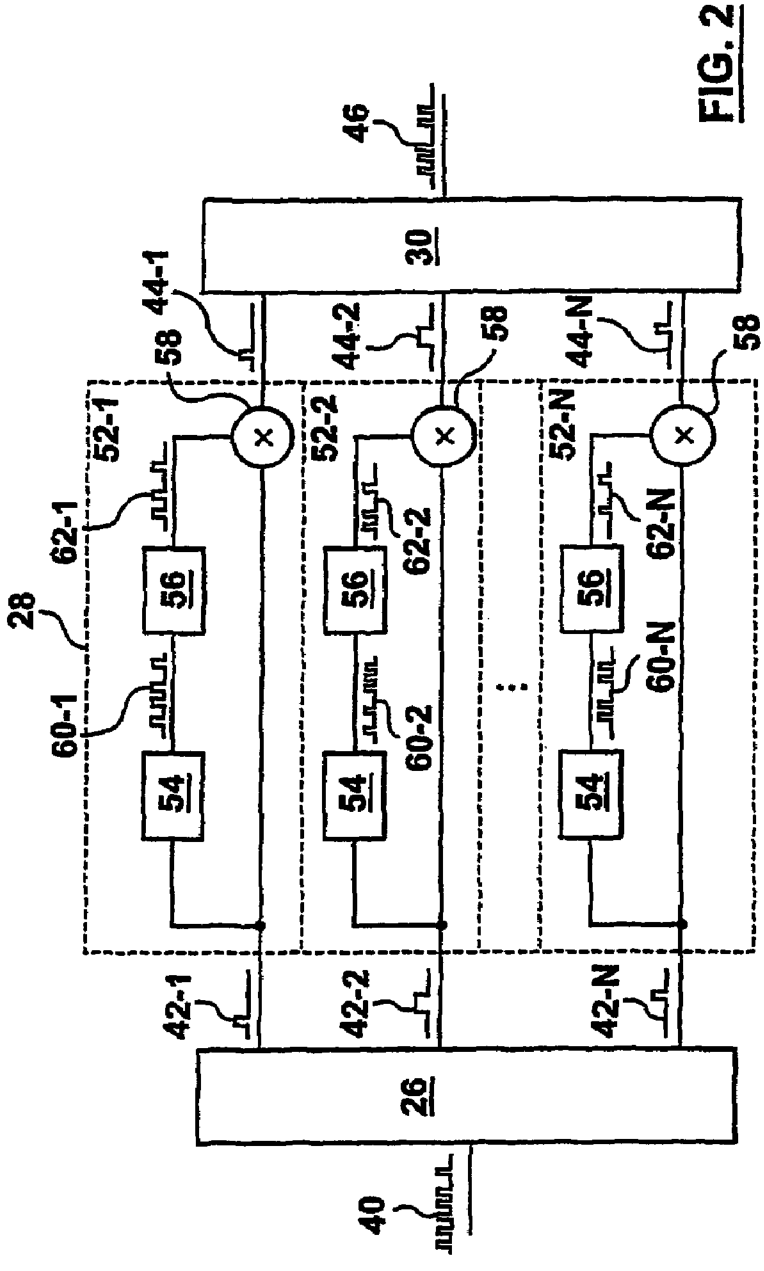
FIG. 2 is block diagram of a gain stage of the circuit of FIG. 1.

Reference is next made to FIG. 2, which illustrates gain stage 28 in greater detail. Gain stage 28 is comprised of a number of gain sub-stages 52-1, 52-2, . . . , 52-N, each of which in turn includes a signal detection stage 54, a noise reduction stage 56 and a multiplier 58.

Each gain sub-stage 52 receives one frequency domain input signal 42 from analysis filter 26. In each gain sub-stage 52, the received frequency domain input signal 42 is split into two parts. One part of the frequency domain input signal 42 is received by the signal detection stage 54 of the gain sub-stage 52. The other part of the frequency domain input signal 42 is received by multiplier 58. Signal detection stage 54 provides a signal index 60 to noise reduction stage 56. Signal index 60 corresponds to frequency domain input signal 42. Noise reduction stage 56 receives signal index 60 and provides a corresponding gain signal 62 to multiplier 58. Multiplier 58 multiplies the frequency domain input signal 42 received by the specific gain sub-stage 52 and the gain signal 62 to provide the frequency domain output signal 44 corresponding to the received frequency domain input signal 42.

Figure 3:
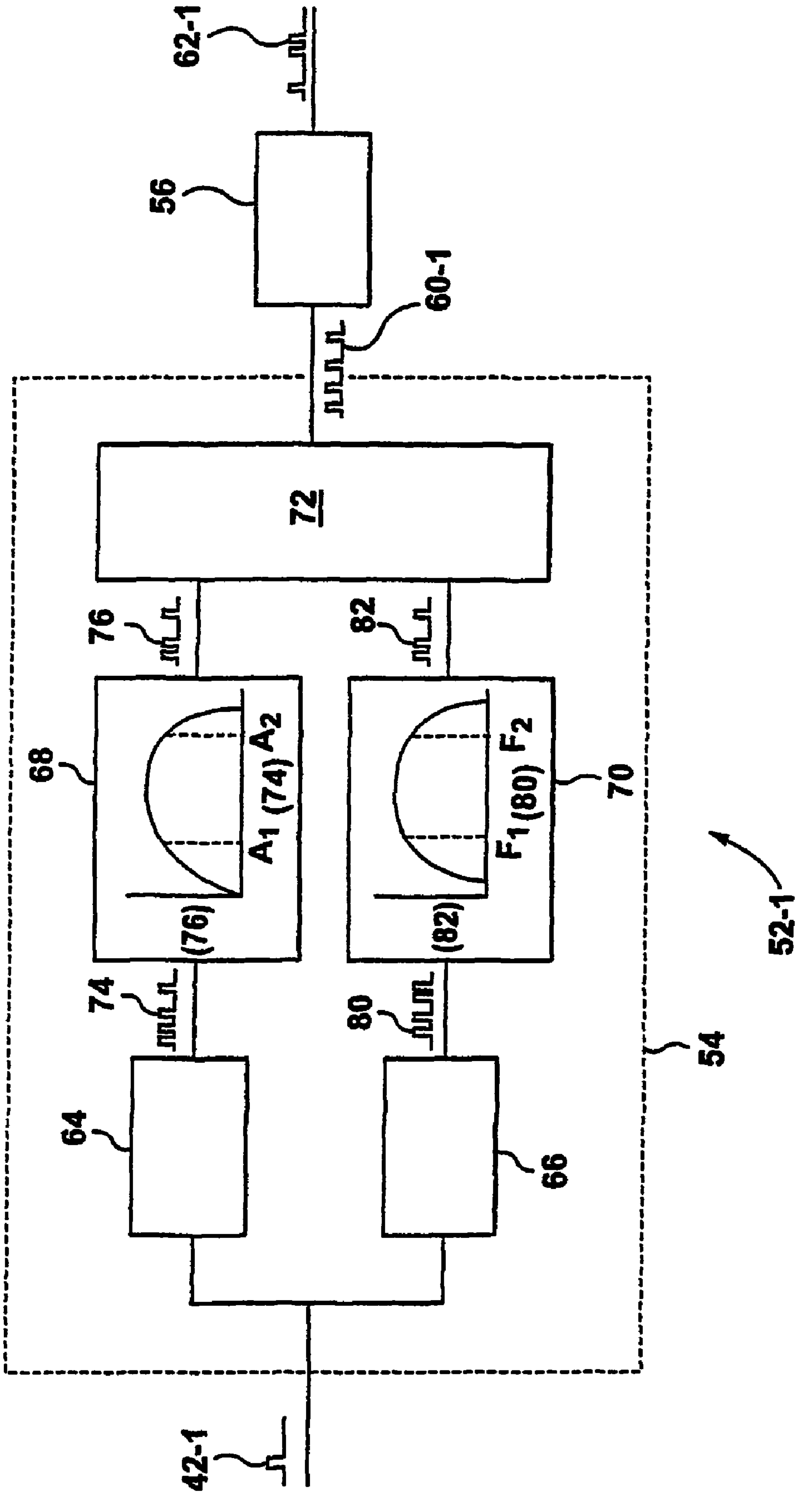
FIG. 3 is a block diagram of a gain sub-stage of the gain stage of FIG. 2.

Reference is next made to FIG. 3 which illustrates gain sub-stage 52-1 in greater detail. Gain sub-stage 52-1 includes an intensity change detector 64, a modulation frequency detector 66, an intensity change processor 68, a modulation frequency processor 70 and an index calculation stage 72.

Intensity change detector 64 receives frequency domain input signal 42-1. Intensity change detector 64 determines the change in intensity (or volume or amplitude) of the sound content of frequency domain input signal 42-1 and provides an intensity change signal 74. Intensity change signal 74 will generally be a digital signal which indicates the amount of change in the intensity of frequency domain input signal 42-1 during a selected time period T.

Intensity change processor 68 transforms intensity change signal 74 to provide an intensity change sub-index 76. In the present exemplary embodiment, intensity change processor 68 is a band pass filter which generates an intensity change sub-index 76 in response to an intensity change signal 74. If the intensity change signal 74 is between thresholds $A_1$ and $A_2$, then intensity change sub-index 76 is larger than when intensity change signal 74 is less than threshold $A_1$ or greater than threshold $A_2$, as is illustrated in intensity change processor 68.

Figure 4:
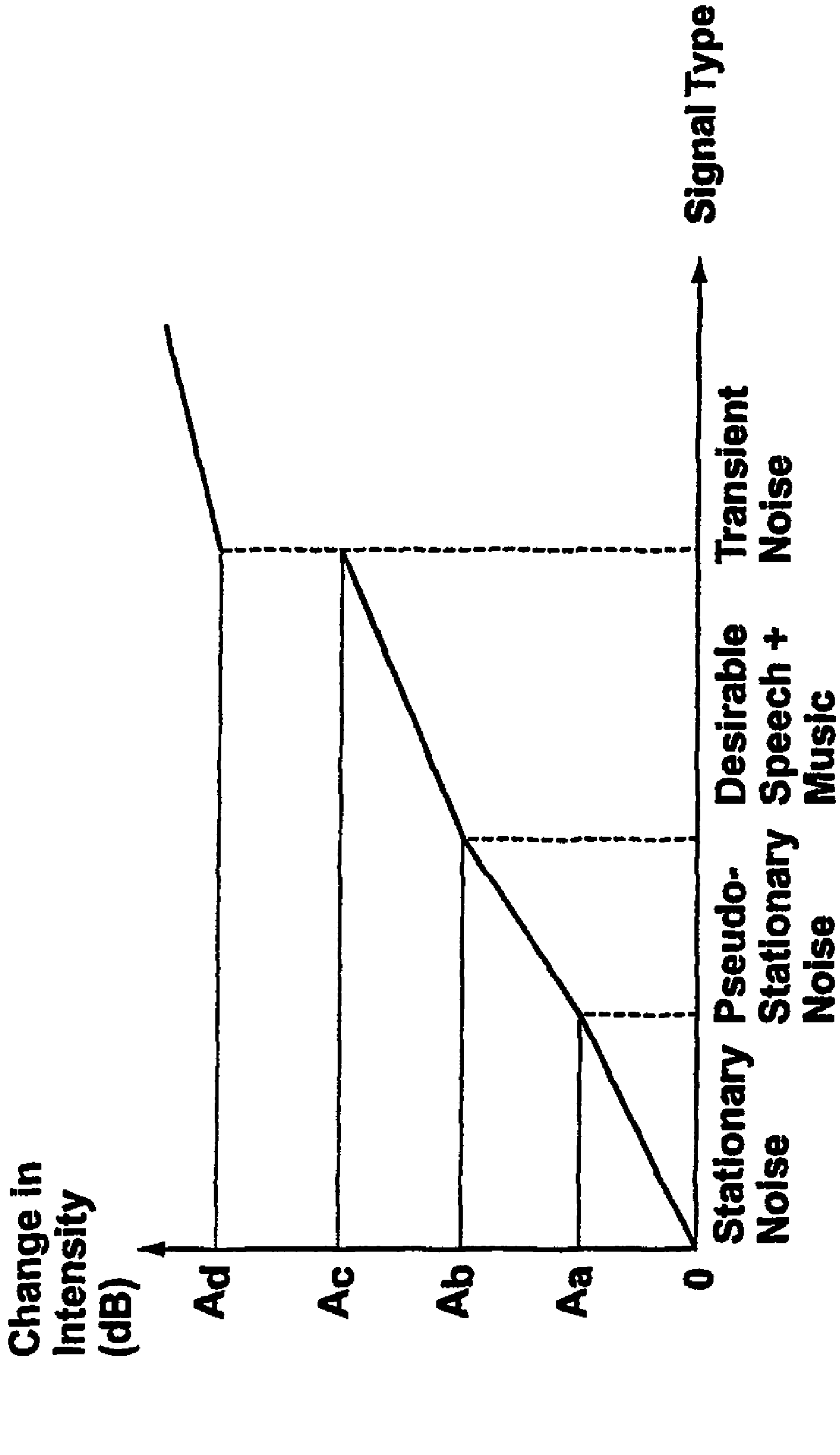
FIG. 4 illustrates the typical change in intensity over a time period for different signal types.

Reference is next made to FIG. 4, which illustrates the selection of thresholds $A_1$ and $A_2$. The four signal types are plotted on the horizontal axis of FIG. 4 against the typical intensity change of each type of signal during time period T. Stationary noises generally have the smallest change (between 0 and $A_a$) in their intensities over time period T. Pseudo-stationary noises exhibit the next smallest amount of change (typically between $A_a$ and $A_b$) during time period T. Desirable speech and music signals typically exhibit an intensity change between $A_b$ and $A_c$ during time period T. Typically, transient noise will have a substantially larger change in its intensity, exceeding $A_d$ during time period T.

The thresholds $A_1$ and $A_2$ of intensity change processor 68 are selected to be equal to $A_b$ and $A_c$, which define the lower and upper limits of the typical change in a desirable speech or music signal in the present example. This has the effect that if the audio content of frequency domain input signal 42-1 is primarily a desirable signal such as speech or music, then intensity change sub-index 76 will have a larger magnitude than if frequency domain input signal 42-1 is primarily stationary noise, pseudo-stationary noise or transient noise.

Reference is again made to FIG. 3. Modulation frequency detector 66 also receives frequency domain input signal 42-1. Modulation frequency detector 66 determines the frequency of intensity modulation of frequency domain input signal 42-1 and provides a modulation frequency signal 80. Modulation frequency signal 80 will typically be a digital signal that indicates the value of the modulation frequency during time period T.

Modulation frequency processor 70 receives modulation frequency signal 80 and transforms it into a modulation frequency sub-index 82. In the present exemplary embodiment, modulation frequency processor 70 is a band pass filter that produces a larger modulation frequency sub-index 82 in response to a modulation frequency signal 80 with a magnitude between threshold values $F_1$ and $F_2$, according to its characteristic, as illustrated in modulation frequency processor 70.

Figure 5:
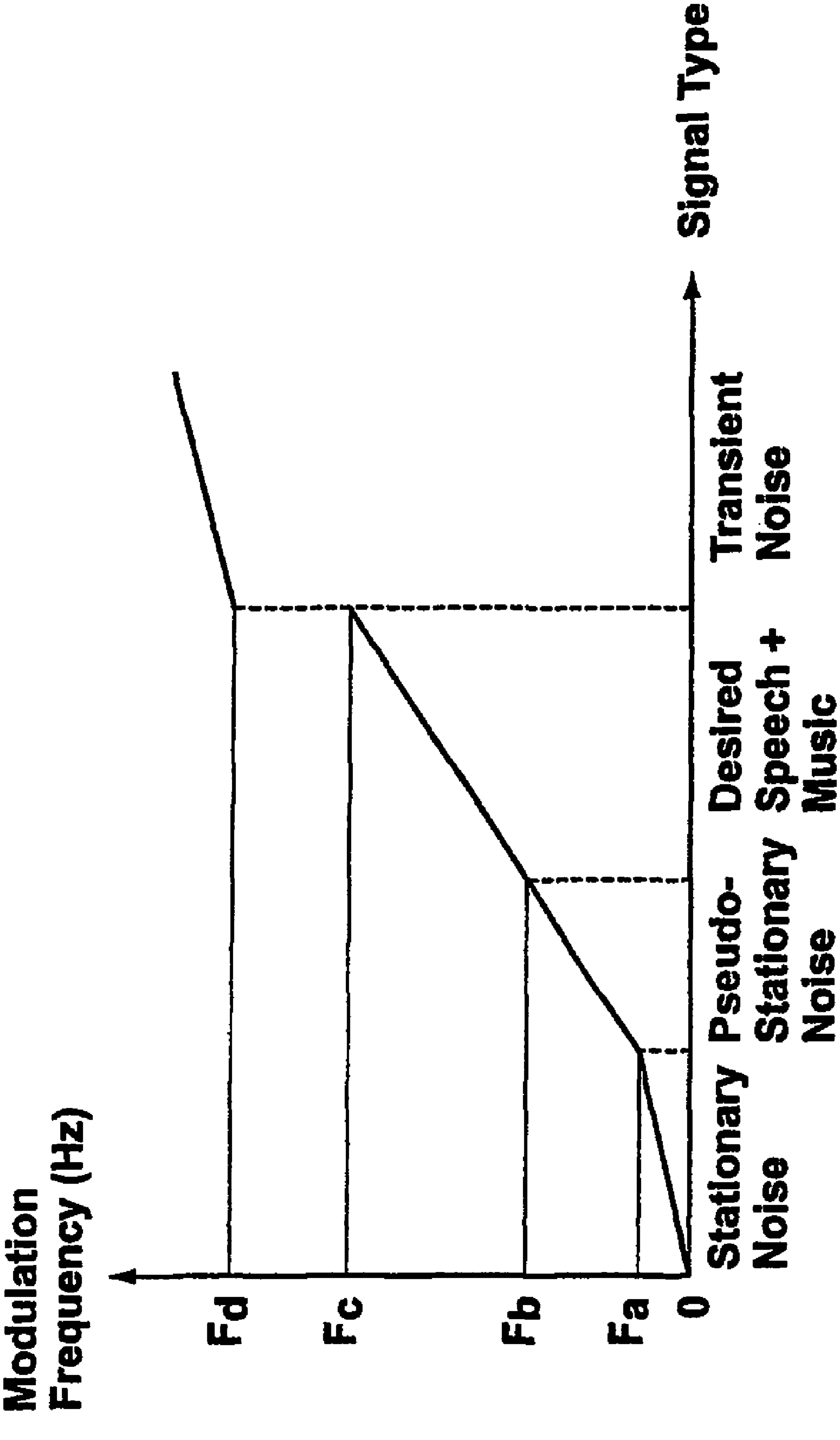
FIG. 5 illustrates the typical modulation frequency over a time period for different signal types.

Reference is next made to FIG. 5, which illustrates the selection of threshold $F_1$ and $F_2$. The four signal types are plotted on the horizontal axis of FIG. 5 against the typical magnitude of their modulation frequency during time period T. Stationary noises generally have the smallest modulation frequency (between 0 and $F_a$) during time period T. Pseudo-stationary noises typically have larger modulation frequency (between $F_a$ and $F_b$) during time period T. Desirable sound signals typically exhibit their modulation frequency between $F_b$ and $F_c$. Transient noises typically exhibit a much larger modulation frequency, typically exceeding $F_d$ during time period T.

Thresholds $F_1$ and $F_2$ of modulation frequency processor 70 are selected to be equal to $F_b$ and $F_c$, so that modulation frequency sub-index 82 is largest when frequency domain input signal 42-1 contains a desired signal than when it contains a noise signal.

FIG. 4 is illustrative of the change in intensity in different noise and audio signal types. A person skilled in the art will recognize that the different signal types may exhibit some overlap in intensity changes and in some cases may differ substantially from those illustrated. In cases where the intensity change of the desired signal is not in a pre-defined range (i.e. between $A_b$ and $A_c$), then the intensity change processor 68 may be varied to select the desirable signal and to suppress other signals. For example, a low pass characteristic may be used to detect stationary and/or pseudo-stationary noises. Similarly, FIG. 5 is only illustrative of the modulation frequency exhibited by different types of signals Intensity change signal 74 and modulation frequency signal 80 will typically be digital signals. The signals may indicate their respective values on a pre-determined scale which corresponds to a selected range of values. The relationship between the range of the intensity change signal 74 and the intensity change of the frequency domain input signal 42 may or may not be linear. The correlation may be skewed to provide greater differentiation for selected parts of the range. For example, the range of the intensity change signal 74 may correlate to intensity changes in a frequency domain input signal 42 as indicated in Table 1.

TABLE 1

Relationship between Intensity Change Signal and Intensity change in frequency domain input signal 42

| Range of intensity change signal 74 | Intensity change in frequency domain input signal 42 |
|---|---|
| $0\text{-}A_a$ | 0-12 dB |
| $A_a\text{-}A_b$ | 12-18 dB |
| $A_b\text{-}A_c$ | 18-36 dB |
| $A_c\text{-}A_d$ | 36-42 dB |
| $>A_d$ | >42 dB |

A person skilled in the art will be capable of configuring intensity change detector 64 to provide either a linear or non-linear relationship between the value of intensity change signal 74 and the magnitude of intensity change in a frequency domain input signal 42 over time period T.

Intensity change processor 68 is configured to convert intensity change signal 74 into intensity change sub-index 76 according to the function with which it is configured (for example, the band pass function described above). Intensity change sub-index 76 will typically have a non-linear relationship with the intensity change of the frequency domain input signal 42-1. Intensity change sub-index 76 may also have a pre-determined range. In the present exemplary embodiment, the relationship defined by the intensity change processor 68 may be configured to provide a higher intensity change sub-index 76 when intensity change signal 74 is between $A_b$ and $A_c$, which, in this exemplary embodiment, correspond to the range of intensity changes in a typical desired music or sound signal over time period T. Intensity change sub-index 76 will have a lower value when intensity change sub-index 74 is less than $A_b$ or greater than $A_c$.

Similarly, modulation frequency signal 80 may have a range greater than $F_d$ which corresponds to changes in the modulation frequency of a frequency domain input signal 42. This relationship may also be linear or non-linear, as in the case of the intensity change signal 74. Also, modulation frequency processor 70 will operate to convert modulation frequency signal 80 into modulation frequency sub-index 82 according to the function programmed into it.

Reference is again made to FIG. 3. Index calculation stage 72 combines intensity change sub-index 76 and modulation frequency sub-index 82 and produces signal index 60-1. Index calculation stage 72 may implement a formula or a two-dimensional look up table to determine the value of signal index 60-1 in response to a particular combination of intensity change sub-index 76 and modulation frequency sub-index 82. Index calculation stage 72 may also employ a formula to calculate signal index 60-1. A combination of a look-up table and a formula may also be used to determine signal index 60-1.

Figure 6:
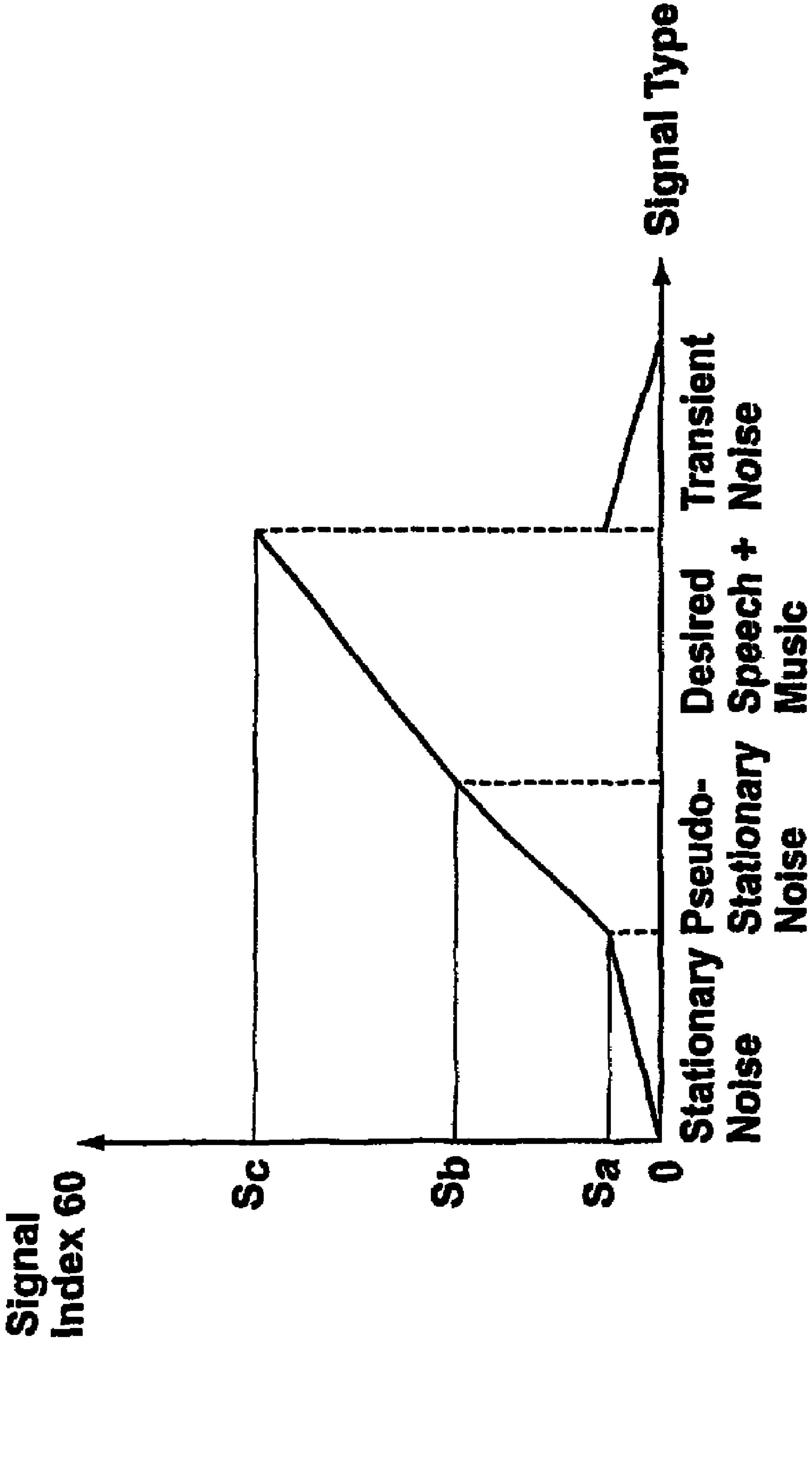
FIG. 6 illustrates a preferred relationship between a signal index produced by the gain sub-stage of FIG. 3 and different signal types.

Reference is next made to FIG. 6, which illustrates a preferred relationship between signal index 60-1 and signal type. In the present exemplary embodiment, signal index 60-1 is calculated by summing intensity change sub-index 76 and modulation frequency sub-index 82. This produces a signal index 60-1 which is larger when frequency domain input signal 42-1 is identified as containing the desired signals according to both the change in intensity and modulation frequency criteria. Signal index 60-1 is comparatively smaller when frequency domain input signal 42-1 is identified as containing pseudo-stationary noise and smaller still when frequency domain input signal 42-1 is identified as containing stationary noises or transient noise. If frequency domain input signal 42-1 is identified as containing stationary noise or transient noise, then signal index 60-1 will have a value between 0 and $S_a$. If frequency domain input signal 42-1 is identified as containing pseudo-stationary noise, then signal index 60-1 will have a value between $S_a$ and $S_b$. If frequency domain input signal 42-1 is identified as containing desired signals such as speech and music, then signal index 60-1 will have a value between $S_b$ and $S_c$.

FIG. 6 is merely illustrative of one set of relationships between signal index 60-1 and signal type. The relationship shown is preferable when speech and music sounds are to be emphasized in comparison to noise sounds. In another embodiment of the present invention, different types of sound signals may be emphasized, depending on the type of sound to be preferentially amplified.

Figure 7:
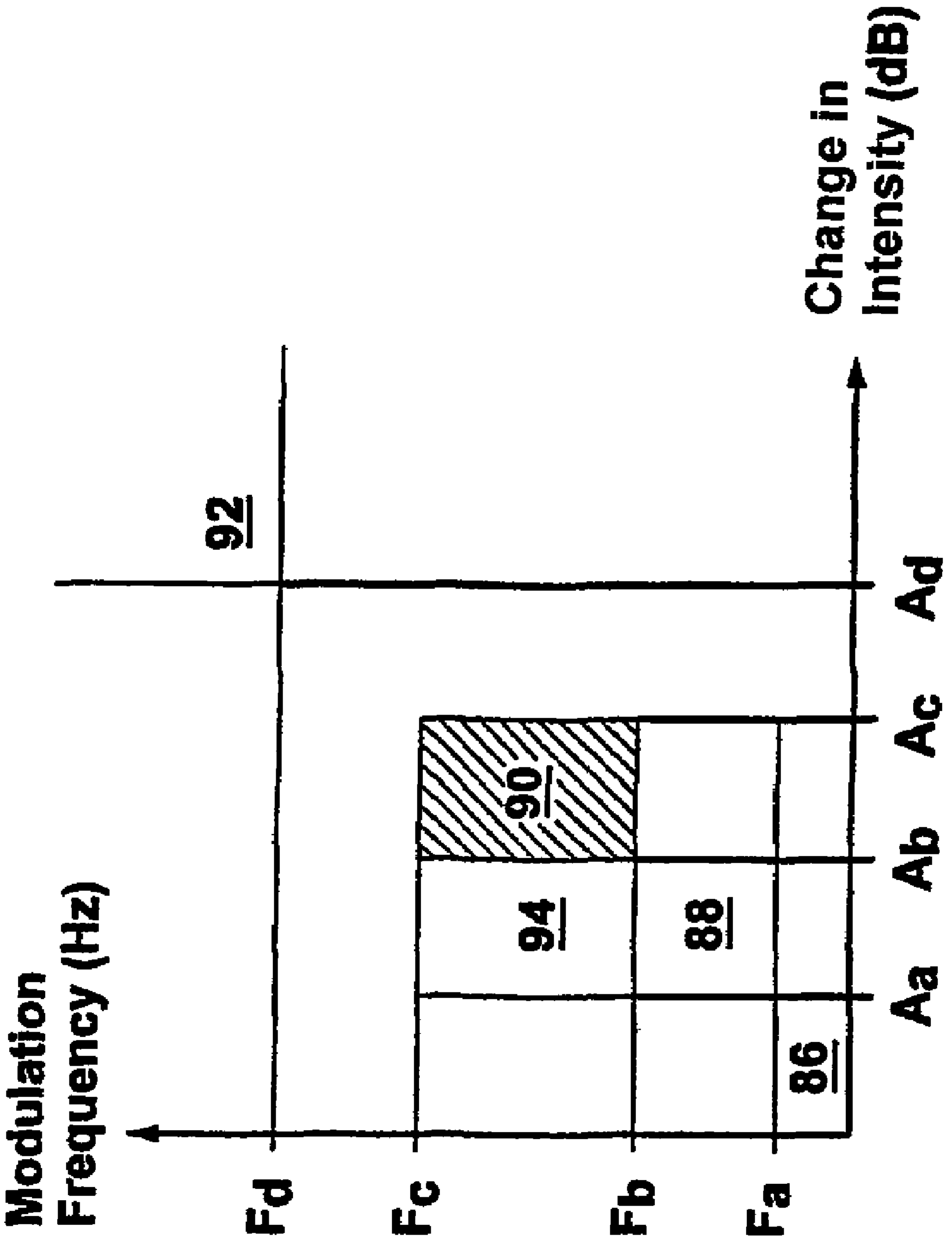
FIG. 7 illustrates modulation frequency of an audio signal versus the change in intensity of different signal types.

One skilled in the art will recognize that some sounds will be classified differently according to the change in intensity and modulation frequency criteria. Reference is next made to FIG. 7, which plots modulation frequency of an audio signal versus the change in intensity of an audio signal. Stationary noises fall into region 86, pseudo-stationary noises fall into region 88, desired speech and music signals into region 90 and transient noises into region 92. It is apparent from FIG. 6 that some frequency domain input signals 42 will not fall within regions 86, 88, 90 or 92. For example, a frequency domain input signal 42 which has an intensity change between $A_a$ and $A_b$ (pseudo-stationary noise) and a modulation frequency between $F_b$ and $F_c$ (desired speech and music) will fall into region 94. Such a signal could represent, for example, a music signal with little change in its intensity, or a background noise with a high modulation frequency (i.e. a siren). In either case, the signal index 60-1 calculated for such a signal will be calculated according to the look-up table or formula (or combination thereof) configured into index calculation stage 72 and may end up with a signal index which is typical of a signal identified by both criteria as a pseudo-stationary noise or as a desired signal.

Figure 8:
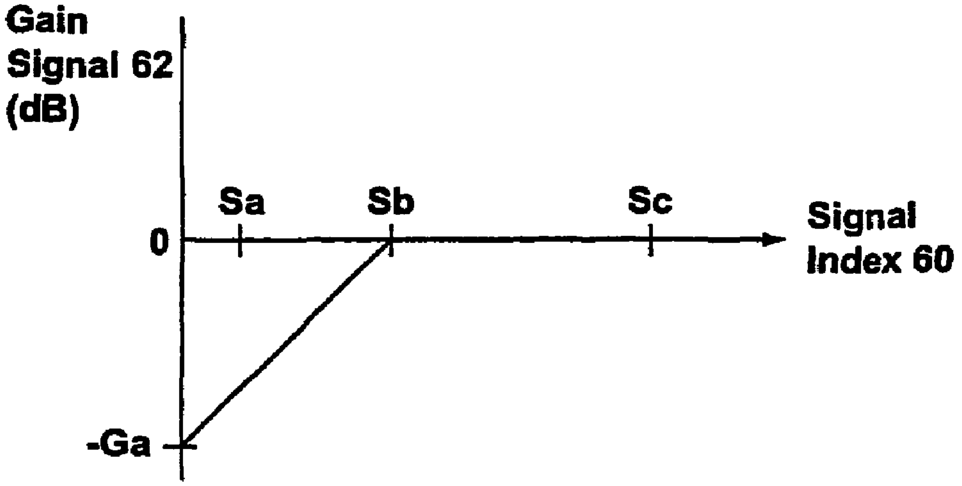
FIG. 8 illustrates the relationship between gain signal 62 produced by the gain sub-stage of FIG. 3 and the signal index of FIG. 6.
Figure 9:
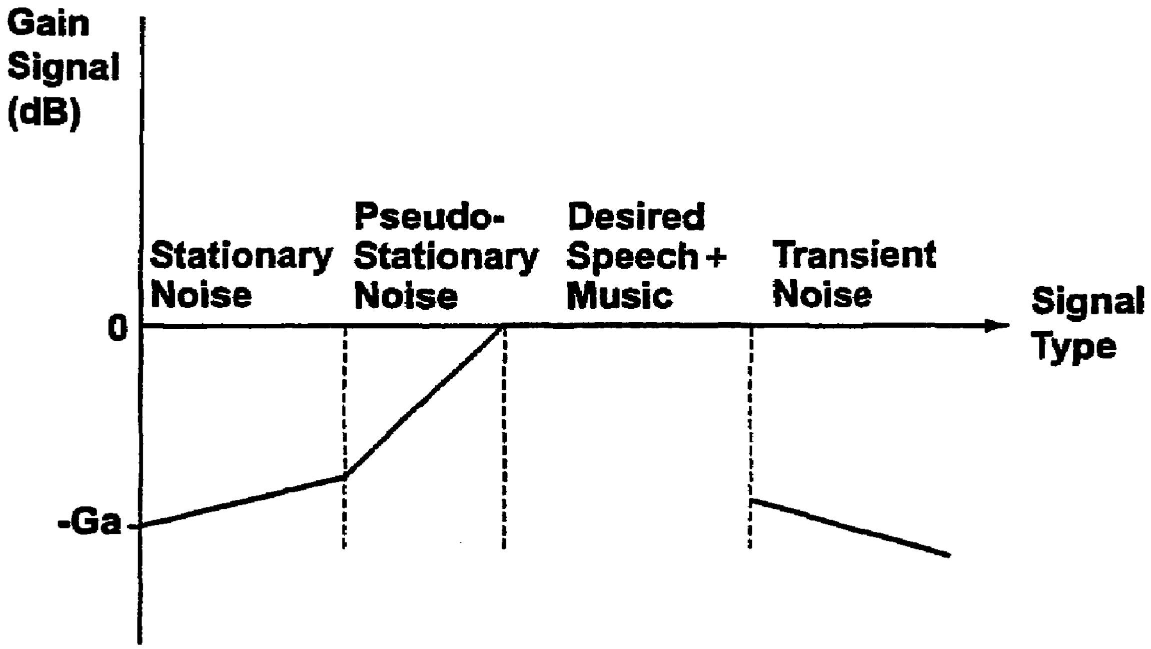
FIG. 9 illustrates a typical gain signal 62 for different signal types.

Reference is again made to FIG. 3. Noise reduction stage 56 receives signal index 60-1 and provides gain signal 62-1 in response to it. FIG. 8 illustrates the relationship between signal index 60 and gain signal 62, in the present exemplary embodiment. If signal index 60 is between 0 and $S_b$, gain signal 62 will have a negative value between $-G_a$ and 0 dB. If signal index 60 is between $S_b$ and $S_c$, gain signal 62 will have a value of 0 dB. FIG. 9 plots the gain signal 62 versus signal type. The relationships illustrated in FIGS. 8 and 9 indicate that in the preferred embodiment gain signal 62 will have no effect on desired speech and music signals, but will attenuate pseudo-stationary signals and substantially attenuate stationary and transient noises.

FIGS. 8 and 9 are only exemplary and noise reduction stage 56 may be configured to provide any relationship between a signal index 60 and a gain signal 62. Preferably, the selected relationship will provide a larger gain (or smaller attenuation) for signal indices which are typical of the type of signal which is to be amplified in preference to other types of signals.

Referring again to FIG. 2, multiplier 58 multiplies frequency domain input signal 42-1 by gain signal 62-1 to produce frequency domain output signal 44-1. Frequency domain input signal 42-1 is either not changed, or is attenuated, as described above.

Each frequency domain input signal 42 is processed separately by a gain sub-stage 52 to provide a set of frequency domain output signals 44, each corresponding to one frequency domain input signal 42. The frequency domain output signals 44, which are separated into different frequency bands that correspond to the frequency bands of the frequency domain input signals 42, are then combined into a single time domain digital output signal 46 by synthesis filter 30.

Referring to FIG. 1, time domain digital output signal 46 is converted into a corresponding analog output signal 48 by DAC 32. Loudspeaker 34 converts analog output signal 48 into an audible output sound signal 50, which may be heard by the user of system 20.

System 20 receives an input sound signal 36 and provides a corresponding output sound signal 50 which is processed to suppress noise components in favor of desirable speech and music signals. Noise is suppressed by dividing the input sound signal 36 into frequency bands, characterizing the sound content of each band separately and suppressing the amplitude or intensity of those bands identified as containing noise. The processed frequency bands are combined to form output sound signal 50.

A second embodiment of the present invention will now be described with reference to FIGS. 10-12. In these Figures, elements with a function corresponding to an element in the embodiment of FIGS. 1-9 are identified by the same reference numerals or by similar reference numerals, increased by 100. This second embodiment has a general structure identical to that shown in FIGS. 1 and 2. The primary structural difference between the two embodiments is the structure of the gain sub-stages 152, which are illustrated in FIG. 11.

Figure 10:
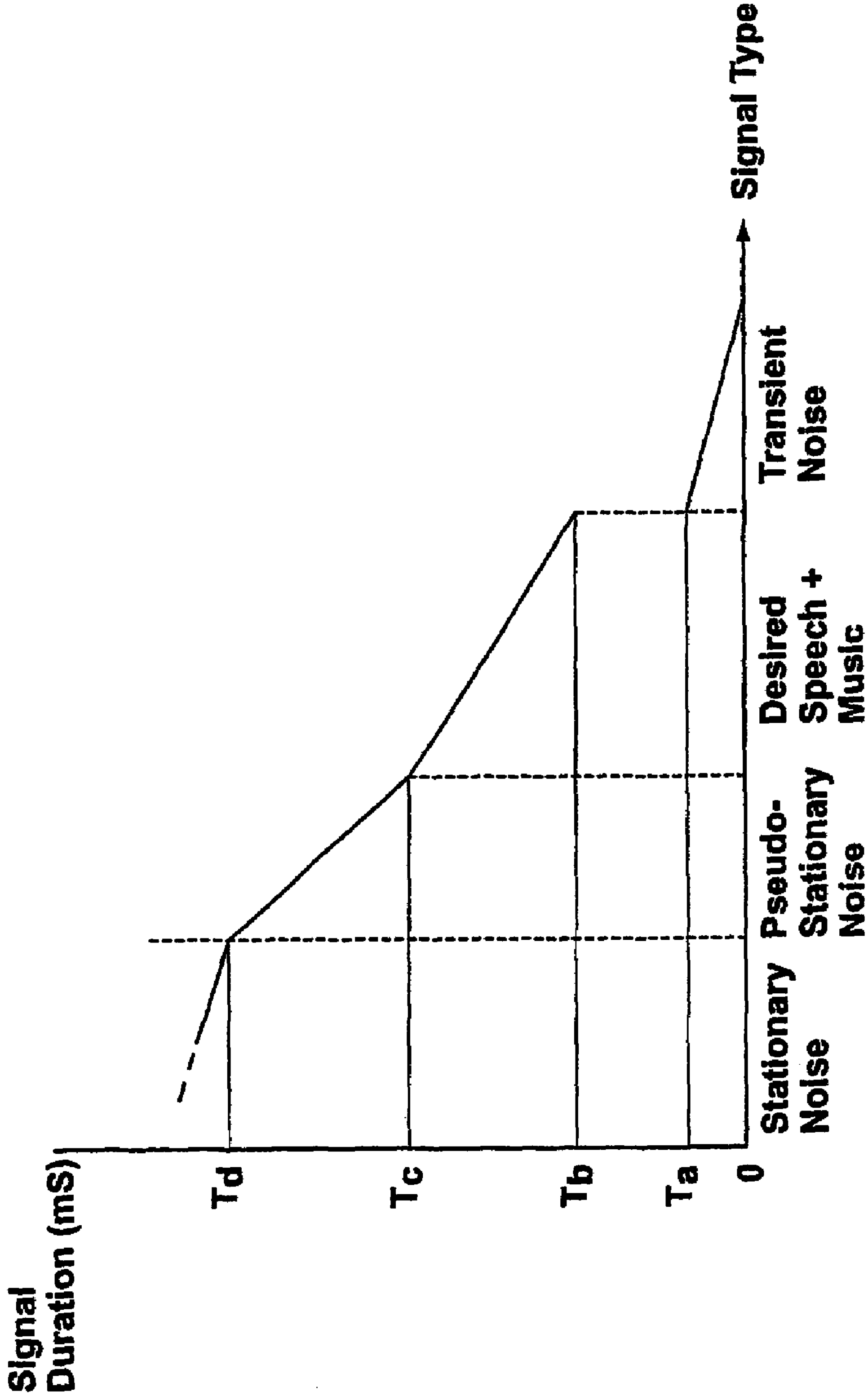
FIG. 10 illustrates a typical signal time duration for different signal types.
Figure 11:
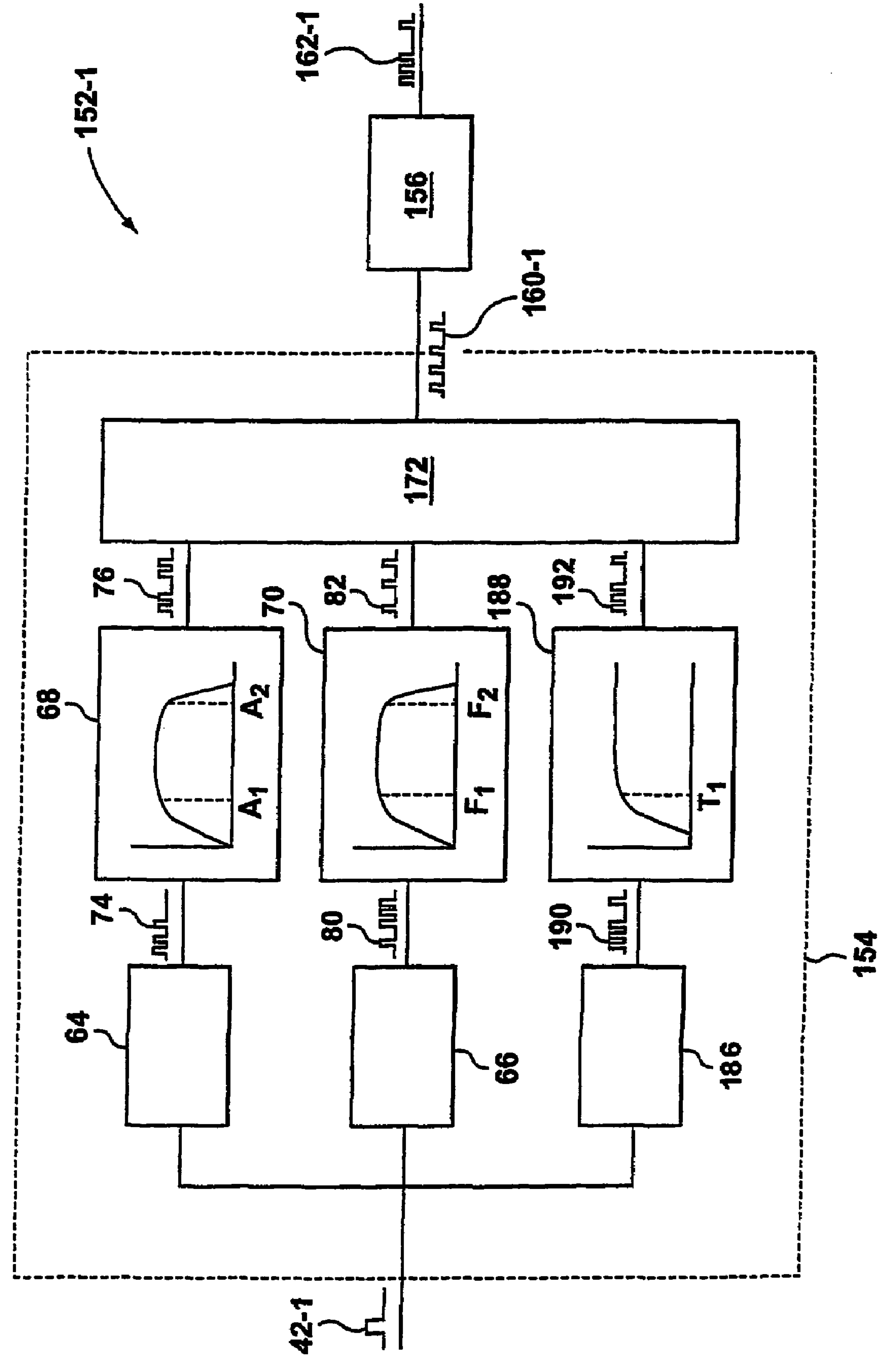
FIG. 11 is a block diagram of a gain sub-stage of a second embodiment of the present invention.

Reference is next made to FIG. 10. The inventors have found that the length of a sound signal is related to its signal type. FIG. 10 illustrates that stationary noises tend to have long durations (longer than $T_d$), often exceeding the time duration T during which a signal is processed. Pseudo-stationary noises generally have shorter time durations (between $T_c$ and $T_d$) than stationary signals, but longer durations than desired speech and music signals, which typically have a time duration between $T_b$ and $T_c$. Transient noises tend to have relatively short durations, typically shorter than $T_a$.

This characteristic of the different signal types may be used to refine the suppression of undesirable signal types. FIG. 11 illustrates a gain sub-stage 152-1, which is adapted to incorporate the time duration characteristic into the operation of characterizing a frequency domain input signal 42-1. Intensity change sub-index 76-1 and modulation frequency sub-index 82-1 are calculated in the same way as in gain sub-stage 52-1. Gain sub-stage 152-1 also includes a time duration detector 186 and a time processor 188. Time duration detector 186 receives frequency domain input signal 42-1 and provides a time duration signal 190. Time duration signal 190 will typically be a digital signal and will have a larger value when the audio content of frequency domain input signal 42-1 has a longer duration, during the selected time period T. Time duration signal 190 may have a selected range, like intensity change signal 74, which corresponds to a selected range of time durations of the different types of noise and desired signals that are likely to be present in frequency domain input signal 42-1. The relationship between time duration signal 190 and the duration of the audio content of frequency domain input signal 42-1 may or may not be linear.

Time processor 188 processes time duration signal 190 to produce a time sub-index 192. Time sub-index 192 will have a smaller value when time duration signal 190 is smaller than threshold $T_1$ and will have a larger value when time duration signal 190 is greater than threshold $T_1$ as illustrated in time processor 188. The inventors have noted that although stationary noise and pseudo-stationary noise generally tend to have a longer duration than desired speech and music signals, there is substantial overlap between the duration of these three types of signals. Accordingly, in this embodiment, time processor 188 implements a high pass filter function to provide a small time sub-index 192 for transient noise signals and a relatively uniform sub-index 192 for stationary noise, pseudo-stationary noise and desired speech and music signals. The threshold $T_1$ for time processor 188 is selected to be equal to $T_b$ (FIG. 10).

In another embodiment, time processor 188 may contain a different criteria (such as a band pass filter, or a more complex function) intended to provide a small time sub-index for stationary noise and pseudo-stationary noise signals. This may be desirable in an environment when these noise signals have a substantially or consistently longer time duration than the desired signals.

Time sub-index 192 may have a range defined like intensity change sub-index 74 and modulation frequency sub-index 82. The three sub-index signals are combined by index calculation stage 172 to produce a signal index 160-1. In this embodiment, index calculation stage 172 simply sums the three sub-index signals to produce signal index 160-1. In another embodiment, index calculation stage may apply a formula which weights the three sub-index signals differentially or may determine signal index 160-1 using a three-dimensional look up table. A look-up table and one or more formulas may also be combined to determine signal index 160-1.

Signal index 160 is used by noise reduction stage 156 to produce a gain signal 162-1. Noise reduction stage 156 operates in a manner analgous to noise reduction stage 56.

Gain sub-stage 152-1 provides a gain signal 162-1 which is responsive to three characteristics of frequency domain input signal 42-1 during time period T: the change in the intensity, the modulation frequency, and the time duration of the audio content of frequency domain input signal 42.

Figure 12:
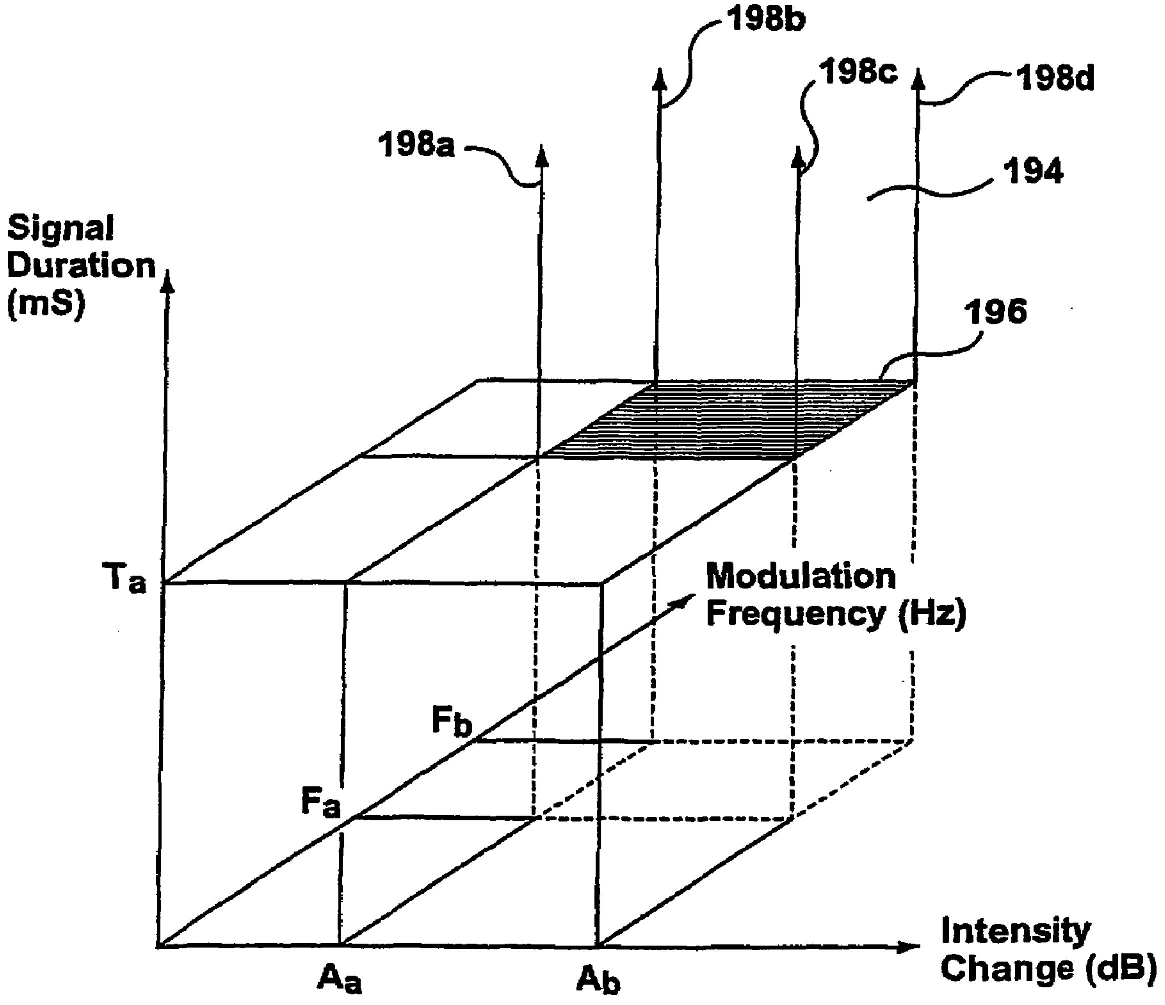
FIG. 12 illustrates the relationship between the change in intensity, modulation frequency and time duration of desired signals.

FIG. 12 is a three dimensional illustration of the characteristics of desired speech and music signals. The change in intensity, modulation frequency and time duration are plotted on the x, z and y axes in FIG. 12. Desired speech and music signals have the following characteristics:

a change in intensity between $A_b$ and $A_c$;

a modulation frequency between $F_b$ and $F_c$; and a time duration longer than $T_b$, during time period T. These signals are found in the region within three dimensional region 194 which extends above rectangle 196 and is bounded by lines 198*a*, 198*b*, 198*c* and 198*d*. The gain signals for these desired signals will be 0 dB, and the gain signal for signals (i.e. noise signals) outside this region will be smaller, leading to different degree of suppression for those noise signals.

The embodiment of FIGS. 10-12 has the advantage that a third characteristic of desirable signals and noises is used to further characterize these desirable signals and noises.

The inventors have selected the following ranges for each of the three characteristics to identify between typical noise signals and desired signals an a typical environment where a hearing impaired person wishes to hear speech and music sounds directed at him or her:

TABLE 2

Characteristics of different signal types

| Signal Type | Typical Change in Intensity | Typical Modulation Freq. | Typical Time Duration |
|---|---|---|---|
| Stationary Noise | 0-12 dB | 0-0.5 Hz | >20 ms |
| Pseudo-stationary noise | 12-18 dB | 0.5-1 Hz | >20 ms |
| Desired Speech and Music | 18-36 dB | 1 Hz-20 Hz | >20 ms |
| Transient Noise | >42 dB | >40 Hz | <10 ms |

As illustrated in FIGS. 4, 5 and 10, there is a jump in the ranges in each characteristic between the desired speech and music signals and transient noise. The portion of the range between these two signal types may be referred to as pseudo-transient noise and detectors 64, 66 and 186 and processors 68, 70 and 188 may be modified to take this additional signal type into account. Using the change in intensity signal type as an example, if pseudo-transient signals are defined as typically exhibiting a change in intensity between 36 and 42 dB over time period T, then intensity change detector 64 may be configured to provide an appropriate intensity change signal 74 between the values for desired signals and transient noise when a change in this range is detected and intensity change processor 68 may be configured to provide an intensity change sub-index 76 between the value for desired signals and transient noise (i.e. similar to the values of intensity change sub-index 76 for pseudo-stationary noise). Similarly pseudo-transient noise may be defined as having a typical modulation frequency during a time period T between 20 Hz and 40 Hz and a typical time duration between 10 ms and 20 ms.

In the present exemplary embodiments, the same time period T is used to determine intensity change signal 74, modulation frequency signal 80 and time duration signal. This is not necessary and different time periods may be used. A person skilled in the art will recognize that the thresholds $A_1$ and $A_2$ of the intensity change processor 68, thresholds $F_1$ and $F_2$ of modulation frequency processor 70 and threshold $T_1$ of time duration processor 188 should be selected to match the time period selected for the analysis of the respective characteristics of the audio signal.

In addition, the specific thresholds $A_1$, $A_2$, $F_1$, $F_2$ and $T_1$ may be selected to be different for each frequency band, depending on the frequency characteristics of the desirable sounds and of the undesirable noise components.

The present exemplary embodiments of the present invention have been described in the context of three types of noise signals: stationary noise, pseudo-stationary noise and transient noise. The desired signals have been defined as speech and music. The present invention is adaptable for characterizing other types of signals as noise and for reducing or suppressing those noise signals in favor of other desired signals. For example, if transient noises are of interest, the present invention may be modified to suppress other signal types by varying the operation of processors 68, 70 and 188.

The present exemplary embodiment utilizes three characteristics of sound signals to characterize the sound content of signals in each frequency domain input signal: the change in intensity, modulation frequency and the time duration of the signal. The present invention is adaptable to use other characteristics of sound signals by changing the characteristics to which detectors 64, 66 and 186 are sensitive. In this case, it will generally be desirable to vary the operation of processors 68, 70 and 188 to correspond to the desired ranges of the new characteristics.

The present exemplary embodiments have been described in the context of typical ambient sounds that a person with a hearing deficiency may wish to hear or suppress. The use of different characteristics may be particularly beneficial when the present invention is used in a different environment with other types of desired signals and noise. For example, if the present invention is used in a specific industrial environment, known characteristics of noise and desired sounds in that environment may be used to suppress the noise.

Other variations of the present invention are possible and will be apparent to a person skilled in the art. All such variations fall within the scope of the present invention, which is limited only by the following claims.

We claim:

1. A method of providing a time domain digital output signal corresponding to a time domain input signal comprising:

(a) converting said time domain input signal into one or more frequency domain input signals;

(b) for each of said frequency domain input signals:

(i) providing a signal index corresponding to said each of said frequency domain input signals to characterize each of said frequency domain input signals as containing a desirable signal or one of a plurality of different types of noise based on various characteristics of different types of noise and desired signals wherein the method includes providing at least a first sub-index corresponding to a change in a first characteristic of the corresponding frequency domain input signal and a second sub-index corresponding to a change in a second characteristic of the corresponding frequency domain input signal, and providing a signal index determined from the first and second sub-indices;

(ii) providing a gain signal corresponding to said signal index; and (iii) amplifying or attenuating said each of said frequency domain input signal in response to said gain signal to provide a frequency domain output signal; and (c) combining said frequency domain output signals to provide said time domain output signal.

2. The method of claim 1 wherein step (b)(i) comprises:

(A) determining, as said first characteristic, a change in intensity of the audio content of said each of said frequency domain input signals during a first time period;

(B) providing, as said first sub-index, an intensity change sub-index corresponding to said change in intensity; and (C) providing said signal index determined from said intensity change sub-index and said second sub-index.

3. The method of claim 1 wherein step (b)(i) comprises:

(A) determining, as said first characteristic, a change in intensity of the audio content of said each of said frequency domain input signals during a first time period;

(B) providing, as said first sub-index, an intensity change sub-index corresponding to said change in intensity;

(C) determining, as said second characteristic, a frequency of intensity modulation of the audio content of said each of said frequency domain input signals during a second time period;

(D) providing, as said second sub-index, a modulation frequency sub-index corresponding to said frequency of intensity modulation; and (E) providing said signal index determined from said intensity change sub-index and said modulation frequency sub-index.

4. The method of claim 1 wherein step (b)(i) is performed by:

(A) determining, as said first characteristic, a change in intensity of the audio content of said each of said frequency domain input signals during a first time period;

(B) providing, as said first sub-index, an intensity change sub-index corresponding to said change in intensity;

(C) determining, as said second characteristic, a frequency of intensity modulation of the audio content of said each of said frequency domain input signals during a second time period;

(D) providing, as said second sub-index, a modulation frequency sub-index corresponding to said frequency of intensity modulation;

(E) determining the time duration of the audio content of said each of said frequency domain input signals during a third time period;

(F) providing a time sub-index corresponding to said time duration; and (G) providing said signal index determined from said intensity change sub-index said modulation frequency sub-index and said time sub-index.

5. The method of claim 2 wherein said intensity change sub-index is highest when said change in intensity corresponds to a range of intensity changes typical of one or more desired types of audio signals.

6. The method of claim 2 wherein said intensity change sub-index is highest when said change in intensity is between about 18 dB to about 36 dB.

7. The method of claim 2 wherein said change in intensity is placed on an intensity change continuum defined by typical changes in intensity exhibited by different types of sounds during said first time period and wherein said intensity change sub-index is selected to correspond to the placement of said change in intensity on said intensity change continuum.

8. The method of claim 7 wherein said intensity change continuum includes a first intensity change range corresponding to stationary noise, a second intensity change range corresponding to pseudo-stationary noise, a third range intensity change corresponding to speech and music and a fourth intensity change range corresponding to transient noise.

9. The method of claim 8 wherein said first intensity change range is below said second intensity change range, said second intensity change range is below said third intensity change range and said third intensity change range is below said fourth intensity change range.

10. The method of claim 8 wherein said intensity change sub-index is highest when said change in intensity falls within a selected one of said first, second, third or fourth intensity change ranges.

11. The method of claim 8 wherein said intensity change sub-index is highest when said change in intensity falls within said third intensity change range.

12. The method of claim 8 wherein said first intensity change range is between about 0 dB to about 12 dB, the second intensity change range is between about 12 dB to about 18 dB, the third intensity change range is between about 18 dB to about 36 dB and the fourth intensity change range includes any intensity change greater than about 42 dB.

13. The method of claim 12 wherein said intensity change continuum further includes a fifth intensity change range corresponding to pseudo-transient noise, and wherein said fifth intensity change range falls between said third and fourth intensity change ranges.

14. The method of claim 13 wherein said fifth intensity change range is between about 36 dB and 42 dB.

15. The method of claim 3 wherein said modulation frequency sub-index is highest when said frequency of intensity modulation corresponds to a range of intensity modulation frequencies typical of one or more desired types of audio signals.

16. The method of claim 3 wherein said modulation frequency sub-index is highest when said frequency of intensity modulation is between about 1 Hz to about 20 Hz.

17. The method of claim 3 wherein said frequency of intensity modulation is placed on an intensity modulation frequency continuum defined by typical intensity modulation frequencies exhibited by different types of sounds during said second time period and wherein said modulation frequency sub-index is selected to correspond to the placement of said frequency of intensity modulation on said intensity modulation frequency continuum.

18. The method of claim 17 wherein said intensity modulation frequency continuum includes a first modulation frequency range corresponding to stationary noise, a second modulation frequency range corresponding to pseudo-stationary noise, a third modulation frequency range corresponding to speech and music and a fourth modulation frequency range corresponding to transient noise.

19. The method of claim 18 wherein said first modulation frequency range is below said second modulation frequency range, said second modulation frequency range is below said third modulation frequency range and said third modulation frequency range is below said fourth modulation frequency range.

20. The method of claim 18 wherein said frequency modulation sub-index is highest when said frequency of intensity modulation falls within a selected one of said first, second, third or fourth modulation frequency ranges.

21. The method of claim 18 wherein said frequency modulation sub-index is highest when said frequency of intensity modulation falls within said third modulation frequency range.

22. The method of claim 18 wherein said first modulation frequency range is between about 0 Hz to about 0.5 Hz, the second modulation frequency range is between about 0.5 Hz to about 1 Hz, the third modulation frequency range is between about 1 Hz to about 20 Hz and the fourth modulation frequency range includes any frequency of intensity modulation greater than about 40 Hz.

23. The method of claim 22 wherein said modulation frequency continuum further includes a fifth modulation frequency range corresponding to pseudo-transient noise, and wherein said fifth modulation frequency range falls between said third and fourth modulation frequency ranges.

24. The method of claim 23 wherein said fifth modulation frequency range is between about 20 Hz and 40 Hz.

25. The method of claim 4 wherein said time sub-index is highest when said time duration corresponds to a range of time durations typical of one or more desired types of audio signals.

26. The method of claim 4 wherein said time sub-index is highest when said time duration is longer than 20 ms.

27. The method of claim 4 wherein said time duration is placed on a time continuum defined by typical time durations exhibited by different types of sounds during said third time period and wherein said time sub-index is selected to correspond to the placement of said time duration on said time continuum.

28. The method of claim 27 wherein said time continuum includes a first time range corresponding to stationary noise, a second time range corresponding to pseudo-stationary noise, a third time range corresponding to speech and music and a fourth time range corresponding to transient noise.

29. The method of claim 28 wherein said fourth time range includes time durations shorter than said first, second, and third time ranges.

30. The method of claim 28 wherein said time sub-index is lowest when said time duration falls within said fourth time range.

31. The method of claim 28 wherein said fourth time range is between 0 ms and 10 ms and wherein said second, and third time ranges are above 20 ms.

32. The method of claim 31 wherein said time continuum further includes a fifth time range corresponding to pseudo-transient noise.

33. The method of claim 32 wherein said fifth time range is between about 10 ms and 20 ms.

34. The method of claim 1 wherein step (b)(i) comprises:

(A) determining, as said first characteristic, a frequency of intensity modulation of the audio content of said each of said frequency domain input signals during a second time period;

(B) providing, as said first sub-index a modulation frequency sub-index corresponding to said frequency of intensity modulation; and (C) providing said signal index determined from said modulation frequency sub-index and said second sub-index.

35. The method of claim 34 wherein said modulation frequency sub-index is highest when said frequency of intensity modulation corresponds to a range of intensity modulation frequencies typical of one or more desired types of audio signals.

36. The method of claim 34 wherein said modulation frequency sub-index is highest when said frequency of intensity modulation is between about 1 Hz to about 20 Hz.

37. The method of claim 34 wherein said frequency of intensity modulation is placed on an intensity modulation frequency continuum defined by typical intensity modulation frequencies exhibited by different types of sounds during said second time period and wherein said modulation frequency sub-index is selected to correspond to the placement of said frequency of intensity modulation on said intensity modulation frequency continuum.

38. The method of claim 37 wherein said intensity modulation frequency continuum includes a first modulation frequency range corresponding to stationary noise, a second modulation frequency range corresponding to pseudo-stationary noise, a third modulation frequency range corresponding to speech and music and a fourth modulation frequency range corresponding to transient noise.

39. The method of claim 38 wherein said first modulation frequency range is below said second modulation frequency range, said second modulation frequency range is below said third modulation frequency range and said third modulation frequency range is below said fourth modulation frequency range.

40. The method of claim 38 wherein said frequency modulation sub-index is highest when said frequency of intensity modulation falls within a selected one of said first, second, third or fourth modulation frequency ranges.

41. The method of claim 38 wherein said frequency modulation sub-index is highest when said frequency of intensity modulation falls within said third modulation frequency range.

42. The method of claim 38 wherein said first modulation frequency range is between about 0 Hz to about 0.5 Hz, the second modulation frequency range is between about 0.5 Hz to about 1 Hz, the third modulation frequency range is between about 1 Hz to about 20 Hz and the fourth modulation frequency range includes any frequency of intensity modulation greater than about 40 Hz.

43. The method of claim 42 wherein said modulation frequency continuum further includes a fifth modulation frequency range corresponding to pseudo-transient noise, and wherein said fifth modulation frequency range falls between said third and fourth modulation frequency ranges.

44. The method of claim 43 wherein said fifth modulation frequency range is between about 20 Hz and 40 Hz.

45. The method of claim 1 wherein step (b)(i) comprises:

(A) determining, as said first characteristic, the time duration of the audio content of said each of said frequency domain input signals during a third time period;

(B) providing, a said first sub-index a time sub-index corresponding to said time duration; and (C) providing said signal index determined from said time sub-index and said second sub-index.

46. The method of claim 45 wherein said time duration is placed on a time continuum defined by typical time durations exhibited by different types of sounds during said third time period and wherein said time sub-index is selected to correspond to the placement of said time duration on said time continuum.

47. The method of claim 46 wherein said time continuum includes a first time range corresponding to stationary noise, a second time range corresponding to pseudo-stationary noise, a third time range corresponding to speech and music and a fourth time range corresponding to transient noise.

48. The method of claim 47 wherein said fourth time range includes time durations shorter than said first, second and third time ranges.

49. The method of claim 47 wherein said time sub-index is lowest when said time duration falls within said fourth time range.

50. The method of claim 47 wherein said fourth time range is between 0 ms and 10 ms and wherein said second, and third time ranges are above 20 ms.

51. The method of claim 47 wherein said time continuum further includes a fifth time range corresponding to pseudo-transient noise.

52. The method of claim 51 wherein said fifth time range is between about 10 ms and 20 ms.

53. The method of claim 1 wherein step (b)(i) comprises:

(A) determining, as said first characteristic, a change in intensity of the audio content of said each of said frequency domain input signals during a first time period;

(B) providing, a said first sub-index, an intensity change sub-index corresponding to said change in intensity;

(C) determining, as said second characteristic the time duration of the audio content of said each of said frequency domain input signals during a third time period;

(D) providing, as said second sub-index a time sub-index corresponding to said time duration; and (E) providing said signal index determined from said intensity change sub-index and said time sub-index.

54. The method of claim 1 wherein step (b)(i) is performed by:

(A) determining, as said first characteristic, a frequency of intensity modulation of the audio content of said each of said frequency domain input signals during a second time period;

(B) providing, as said first sub-index a modulation frequency sub-index corresponding to said frequency of intensity modulation;

(C) determining, as said second characteristic, the time duration of the audio content of said each of said frequency domain input signals during a third time period;

(D) providing, as said second sub-index, a time sub-index corresponding to said time duration; and (E) providing said signal index determined from said modulation frequency sub-index and said time sub-index.

55. A signal processing apparatus for receiving a time domain digital input signal having an input frequency spectrum and for providing a time domain digital output signal, said apparatus comprising:

(a) an analysis filter for receiving said time domain digital input signal and for providing N frequency domain digital input sub-signals, each of said frequency domain digital input sub-signals corresponding to a portion of said in put frequency spectrum, and wherein N is a positive integer;

(b) N signal detection and noise reduction stages for providing N frequency domain digital output sub-signals, each of said signal detection and noise reduction stages including:

(i) a signal detection stage coupled to said analysis filter to receive one of said frequency domain input signals and for providing a signal index corresponding to said one of said frequency domain input signals to characterize each of said frequency domain input signals as containing a desirable signal or one of different types of or a type of noise based on various characteristics of a plurality of different types of noise and of desired signals; each signal detection stage comprising a first detector for providing a first characteristic corresponding to said one of said frequency domain input signals, a first processor connected to the first detector for providing a first sub-index corresponding to the first characteristic, a second detector for providing a second characteristic corresponding to said one of said frequency domain input signals, and a second processor connected to the second detector for providing a second sub-index corresponding to the second characteristic, and an index calculation stage connected to the first and second processors for determining said signal index from the first and second sub-indices (ii) a noise reduction stage coupled to said signal detection stage for receiving said signal index and for providing a gain signal corresponding to said signal index; and (iii) a multiplier coupled to said noise reduction stage for providing one of N frequency domain digital output sub-signals in response to said one of said frequency domain input signals and the corresponding signal index; and (c) a synthesis filter for receiving said N frequency domain digital output sub-signals and for providing said time domain digital output signal.

56. The signal processing apparatus of claim 55 wherein each of said signal detection stages comprises:

(d) an intensity change detector, as said first detector, for providing an intensity change signal corresponding to a change in the intensity of said one of said frequency domain input signals during a first selected time period;

(e) an intensity change processor, as said first processor, for providing an intensity change sub-index corresponding to said intensity change signal; and (f) said index calculation stage for determining said signal index from said intensity change sub-index and said second sub-index.

57. The signal processing apparatus of claim 55 wherein each of said signal detection stages comprises:

(d) an intensity change detector, as said first detector, for providing an intensity change signal corresponding to a change in the intensity of said one of said frequency domain input signals during a first selected time period;

(e) an intensity change processor, as said first processor, for providing an intensity change sub-index corresponding to said intensity change signal;

(f) a modulation frequency detector, as said second detector, for providing a modulation frequency signal corresponding to a frequency of intensity modulation of the sound content of said one of said frequency domain input signals during a second time period;

(g) a modulation frequency processor, as said second processor, for providing a modulation frequency sub-index corresponding to said modulation frequency signal (h) said index calculation stage for determining said signal index from said intensity change sub-index and said modulation frequency sub-index.

58. The signal processing apparatus of claim 55 wherein each of said signal detection stages comprises:

(d) an intensity change detector, as said first detector, for providing an intensity change signal corresponding to a change in the intensity of said one of said frequency domain input signals during a first selected time period;

(e) an intensity change processor, as said first processor, for providing an intensity change sub-index corresponding to said intensity change signal;

(f) a modulation frequency detector, as said second detector, for providing a modulation frequency signal corresponding to a frequency of intensity modulation of the sound content of said one of said frequency domain input signals during a second time period;

(g) a modulation frequency processor, as said second processor, for providing a modulation frequency sub-index corresponding to said modulation frequency signal;

(h) a time duration detector for providing a time duration signal corresponding to a time duration of the sound content of said one of said frequency domain input signals during a third time period;

(i) a time processor for providing a time sub-index corresponding to said time duration signal;

(j) said index calculation stage for determining said signal index from said intensity change sub-index said modulation frequency sub-index and said time sub-index.

59. The signal processing apparatus of claim 55 wherein each of said signal detection stages comprises:

(d) a modulation frequency detector, as said first detector, for providing a modulation frequency signal corresponding to the frequency of intensity modulation of said one of said frequency domain input signals during a second selected time period;

(e) a modulation frequency processor for providing a modulation frequency sub-index corresponding to said, as said first processor, modulation frequency signal; and (f) said index calculation stage for determining said signal index from said modulation frequency sub-index and said second sub-index.

60. The signal processing apparatus of claim 55 wherein each of said signal detection stages comprises:

(d) a time duration detector, as said first detector, for providing a time duration signal corresponding to the duration of the audio content in said one of said frequency domain input signals during a third selected time period;

(e) a time processor, as said first processor, for providing a time sub-index corresponding to said time duration signal; and (f) said index calculation stage for determining said signal index from said time sub-index and said second sub-index.

61. The signal processing apparatus of claim 56 wherein said intensity change processor is configured to provide a higher intensity change sub-index in response to a range of intensity changes typical of a selected signal type.

62. The signal processing apparatus of claim 56 wherein said intensity change processor is configured to provide a higher intensity change sub-index in response to intensity changes between about 18 dB to about 36 dB.

63. The signal processing apparatus of claim 57 wherein said modulation frequency processor is configured to provide a higher modulation frequency sub-index in response to a range of frequency of intensity modulation typical of a selected signal type.

64. The signal processing apparatus of claim 57 wherein said modulation frequency processor is configured to provide a higher modulation frequency sub-index in response to a range of frequency of intensity modulation between about 1 Hz and 20 Hz.

65. The signal processing apparatus of claim 58 wherein said time processor is configured to provide a higher time sub-index in response to a range of time durations typical of a selected signal type.

66. The signal processing apparatus of claim 58 wherein said time processor is configured to provide a higher time sub-index in response to a time duration greater than 20 ms.

67. The signal processing apparatus of claim 59 wherein said modulation frequency processor is configured to provide a higher modulation frequency sub-index in response to a range of frequency of intensity modulation typical of a selected signal type.

68. The signal processing apparatus of claim 59 wherein said modulation frequency processor is configured to provide a higher modulation frequency sub-index in response to a range of frequency of intensity modulation between about 1 Hz and 20 Hz.

69. The signal processing apparatus of claim 60 wherein said time processor is configured to provide a higher time sub-index in response to a range of time durations typical of a selected signal type.

70. The signal processing apparatus of claim 60 wherein said time processor is configured to provide a higher time sub-index in response to a time duration greater than 20 ms.

* * * * *